United States Patent
Takata et al.

(10) Patent No.: US 12,049,906 B2
(45) Date of Patent: Jul. 30, 2024

(54) PUMP APPARATUS

(71) Applicant: MITSUBISHI HEAVY INDUSTRIES, LTD., Tokyo (JP)

(72) Inventors: Ryo Takata, Tokyo (JP); Masaharu Nakamura, Tokyo (JP); Masamitsu Watanabe, Tokyo (JP); Hiromichi Hiraki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/013,649

(22) PCT Filed: Aug. 31, 2021

(86) PCT No.: PCT/JP2021/031916
§ 371 (c)(1),
(2) Date: Dec. 29, 2022

(87) PCT Pub. No.: WO2022/050269
PCT Pub. Date: Mar. 10, 2022

(65) Prior Publication Data
US 2023/0358252 A1    Nov. 9, 2023

(30) Foreign Application Priority Data

Sep. 4, 2020   (JP) .................. 2020-148970

(51) Int. Cl.
*F04D 29/42*   (2006.01)
*F02C 3/045*   (2006.01)
(Continued)

(52) U.S. Cl.
CPC ......... *F04D 29/4293* (2013.01); *F02M 37/12* (2013.01); *F04D 1/00* (2013.01);
(Continued)

(58) Field of Classification Search
CPC ...... F04D 13/043; F04D 13/04; F04D 29/061; F04D 29/4293; F04D 29/24; F04D 1/00;
(Continued)

(56) References Cited

U.S. PATENT DOCUMENTS 3,093,084 A * 6/1963 Derderian ........... F04D 29/2238
                                                           417/409
5,073,335 A   12/1991 Townsend
(Continued)

FOREIGN PATENT DOCUMENTS

DE          309856       12/1918
JP       2007-205353      8/2007
(Continued)

OTHER PUBLICATIONS

International Search Report issued Oct. 26, 2021 in International Application No. PCT/JP2021/031916.
(Continued)

*Primary Examiner* — Justin D Seabe
*Assistant Examiner* — Michael K. Reitz
(74) *Attorney, Agent, or Firm* — Wenderoth, Lind & Ponack, L.L.P.

(57) ABSTRACT

A pump apparatus includes: a rotational shaft; a hub portion mounted to the rotational shaft; a centrifugal pump vane mounted to a circumferential surface of the hub portion; an annular disc portion mounted to a tip end of the centrifugal pump vane; and an axial turbine blade mounted to an outer circumferential surface of the annular disc portion. A liquid flow passage through which a liquid flowing from a first side toward a second side in an axis direction of the rotational shaft flows into the centrifugal pump vane is formed at a radially inner side of the annular disc portion, and a gas flow passage through which a gas flowing from the second side toward the first side passes through the axial turbine blade is formed at a radially outer side of the annular disc portion.

13 Claims, 9 Drawing Sheets

(51) Int. Cl.
*F02C 3/073* (2006.01)
*F02M 37/12* (2006.01)
*F04D 1/00* (2006.01)
*F04D 13/04* (2006.01)
*F04D 29/24* (2006.01)

(52) U.S. Cl.
CPC .......... *F04D 13/043* (2013.01); *F04D 29/24* (2013.01); *F02C 3/045* (2013.01); *F02C 3/073* (2013.01)

(58) Field of Classification Search
CPC .. F02C 3/073; F02C 3/045; F02C 7/32; F02B 37/00; F02M 37/12; F01D 5/022
See application file for complete search history.

(56) References Cited

U.S. PATENT DOCUMENTS

| | | | |
|---|---|---|---|
| 7,040,082 B2 | 5/2006 | Bouiller et al. | |
| 7,828,511 B1 | 11/2010 | Pinera et al. | |
| 8,192,141 B1* | 6/2012 | Dale | F04D 19/022 |
| | | | 415/199.5 |
| 2003/0230070 A1* | 12/2003 | Platts | F02C 3/045 |
| | | | 60/39.43 |
| 2004/0011018 A1 | 1/2004 | Bouiller et al. | |
| 2006/0263214 A1* | 11/2006 | Matheny | F04D 29/286 |
| | | | 415/208.2 |
| 2007/0175222 A1 | 8/2007 | Donohue et al. | |
| 2010/0218498 A1 | 9/2010 | Shibui et al. | |
| 2011/0211972 A1* | 9/2011 | London | F01D 9/045 |
| | | | 416/223 R |
| 2020/0072222 A1* | 3/2020 | Pagnier | F04D 29/406 |

FOREIGN PATENT DOCUMENTS

| | | |
|---|---|---|
| JP | 4115902 | 7/2008 |
| WO | 2007/141968 | 12/2007 |

OTHER PUBLICATIONS

Extended European Search Report issued Nov. 21, 2023 in corresponding European Application No. 21864327.8.

* cited by examiner

PUMP APPARATUS

TECHNICAL FIELD

The present disclosure relates to a pump apparatus for pumping liquids.

The present application claims priority based on Japanese Patent Application No. 2020-148970 filed on Sep. 4, 2020, with the Japanese Patent Office, the contents of which are incorporated herein by reference.

BACKGROUND ART

A turbo machine that drives a liquid pump such as a fuel pump with a turbine is known (see Patent Documents 1 and 2, for instance). Patent Document 1 discloses a turbo machine with a fuel pump connected to the first side of a driving shaft and a turbine connected to the second side of the driving shaft, the turbo machine further including a generator mounted to the center of the driving shaft. Furthermore, Patent Document 2 discloses a system integrating an air turbine with an electric motor, as a system for driving a fuel pump.

CITATION LIST

Patent Literature

Patent Document 1: JP2007-205353A
Patent Document 2: JP4115902B

SUMMARY

Problems to be Solved

A turbo machine with a fuel pump connected to the first side of a driving shaft and a turbine connected to the second side of the driving shaft, as disclosed in Patent Document 1, tends to have a considerably long driving shaft in the axial direction, and thus the size and the weight of the turbo machine may increase. In a case where such a turbo machine is configured such that an apparatus for recovering power (rotational force of the driving shaft) such as a generator or an apparatus for applying power (rotational force of the driving shaft) such as an electric motor is mounted to the driving shaft, the length of the driving shaft in the axis direction may increase, and the number of bearings and seals mounted to the driving shaft may increase.

Furthermore, a high-temperature working fluid of the above turbine may cause thermal degradation and performance deterioration of the bearings and seals mounted to the driving shaft, and it is necessary to provide a cooling structure for cooling the bearings and seals mounted to the driving shaft. Thus, the size, the weight, and the number of parts of the turbo machine may increase, which may impair the reliability of the turbo machine. It should be noted that integrating the generator or the electric motor with the turbine as in Patent Document 2 does not solve the above problems.

In view of the above, an object of at least one embodiment of the present disclosure is to provide a pump apparatus capable of reducing the length of the rotational shaft of the pump apparatus in the axis direction, and suppress deterioration of the reliability of the pump apparatus.

Solution to the Problems

According to an embodiment of the present disclosure, a pump apparatus includes: a rotational shaft; a hub portion mounted to the rotational shaft; a centrifugal pump vane mounted to a circumferential surface of the hub portion, an annular disc portion mounted to a tip end of the centrifugal pump vane; and an axial turbine blade mounted to an outer circumferential surface of the annular disc portion. A liquid flow passage through which a liquid flowing from a first side toward a second side in an axis direction of the rotational shaft flows into the centrifugal pump vane is formed at a radially inner side of the annular disc portion, and a gas flow passage through which a gas flowing from the second side toward the first side passes through the axial turbine blade is formed at a radially outer side of the annular disc portion.

Advantageous Effects

According to at least one embodiment of the present disclosure, provided is a pump apparatus capable of reducing the length of the rotational shaft of the pump apparatus in the axis direction, and suppress deterioration of the reliability of the pump apparatus.

DETAILED DESCRIPTION

Figure 1:
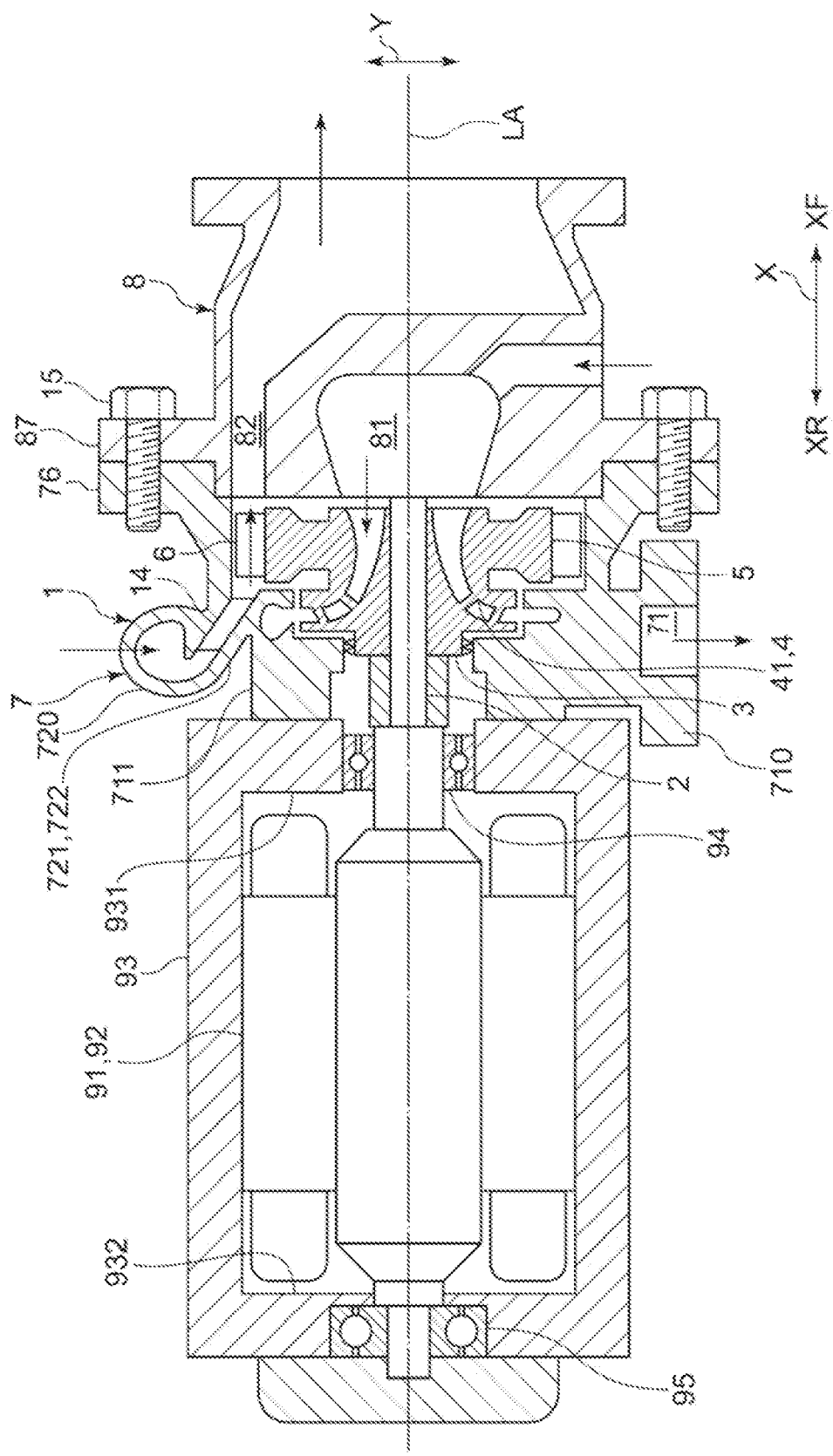
FIG. 1 is a schematic cross-sectional diagram of a pump system having a pump apparatus according to an embodiment of the present disclosure, taken along the axis of the pump system.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction". "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features may be indicated by the same reference numerals and not described in detail.

Figure 2:
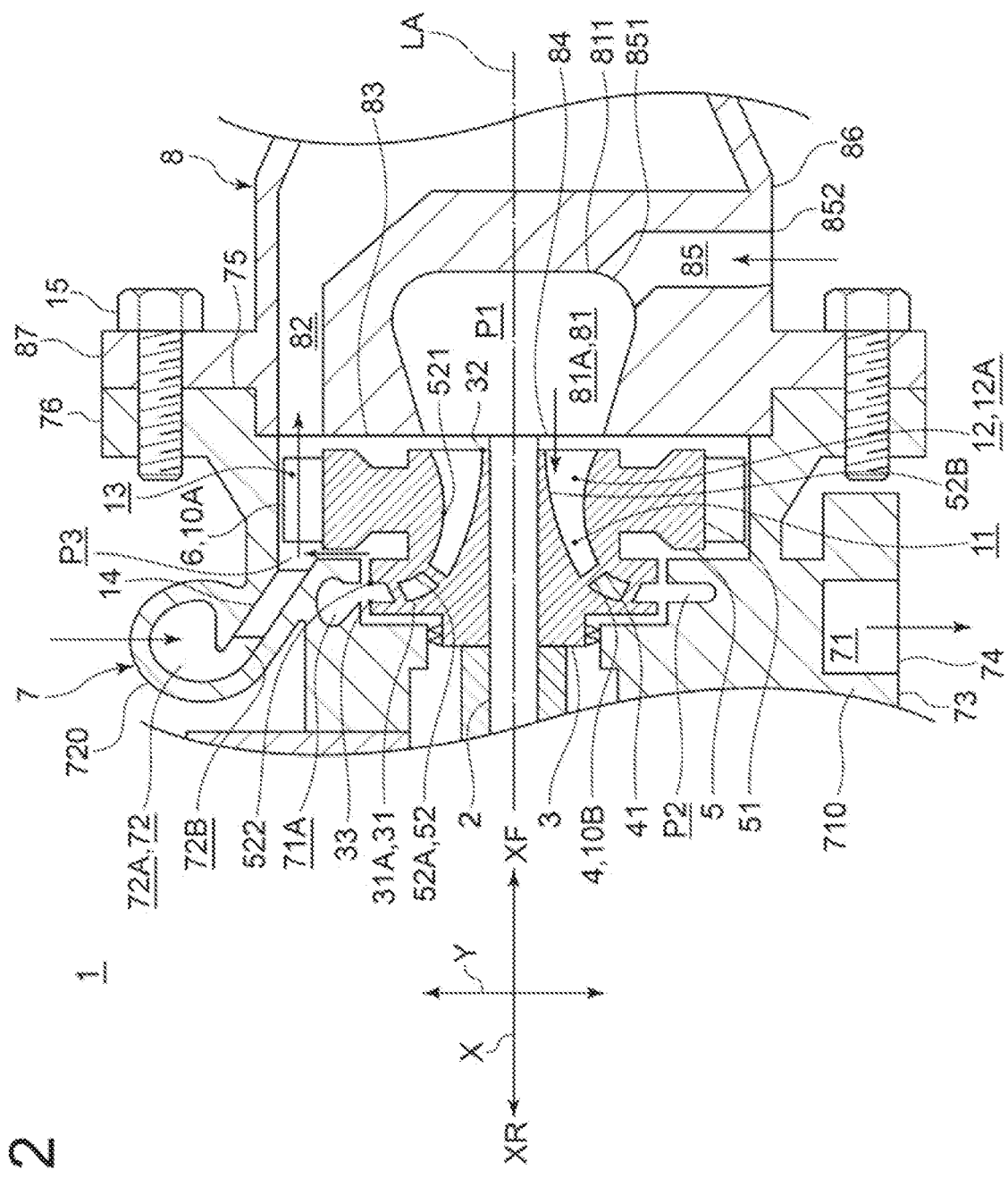
FIG. 2 is a schematic cross-sectional diagram of a pump apparatus according to an embodiment of the present disclosure, taken along the axis of the pump apparatus.

FIG. 1 is a schematic cross-sectional diagram of a pump system having a pump apparatus according to an embodiment of the present disclosure, taken along the axis of the pump system. FIG. 2 is a schematic cross-sectional diagram of a pump apparatus according to an embodiment of the present disclosure, taken along the axis of the pump apparatus.

As depicted in FIGS. 1 and 2, a pump apparatus 1 according to some embodiments includes a rotational shaft 2, a hub portion 3 mounted to the rotational shaft 2, a centrifugal pump vane 4 mounted to a circumferential surface 31 of the hub portion 3, an annular disc portion 5 mounted to a tip end 41 of the centrifugal pump vane 4, and an axial turbine blade 6 mounted to an outer circumferential surface 51 of the annular disc portion 5. A pump system 10, described later, at least includes the pump apparatus 1.

The rotational shaft 2 has a longitudinal direction along a direction (hereinafter, axis direction X) in which the axis LA of the rotational shaft 2 extends. The circumferential surface 31 of the hub portion 3 includes a concave curved surface 31A curved in a concave shape in a cross section taken along the axis LA. The concave curved surface 31A is configured such that the distance from the axis LA increases from the first end (front end) 32 in the axis direction X toward the second end (rear end) 33 in the axis direction X.

Hereinafter, the first side where the front end 32 (the right side in the drawing) is positioned with regard to the rear end 33 of the concave curved surface 31A in the axis direction X is defined as the front side XF, and the opposite side to the front side XF in the axis direction X (the left side in the drawing) is defined as the rear side XR. Furthermore, the radial direction Y of the rotational shaft 2 may be merely referred to as the radial direction, and the circumferential direction of the rotational shaft 2 may be merely referred to as the circumferential direction.

As depicted in FIG. 2, the annular disc portion 5 has an inner circumferential surface 52 including a convex curved surface 52A curved in a convex shape in a cross section taken along the axis LA. The convex curved surface 52A is configured such that the distance from the axis LA increases from a front end 521 in the axis direction X toward a rear end 522 in the axis direction X. The centrifugal pump vane 4 has a root end mounted to the concave curved surface 31A of the hub portion 3, and a tip end 41 positioned opposite to the root end and mounted to the convex curved surface 52A of the annular disc portion 5. The convex curved surface 52A of the annular disc portion 5 is positioned at the outer side of the concave curved surface 31A of the hub portion 3 in the radial direction, and arranged to have a gap from the concave curved surface 31A.

The pump apparatus 1 has a centrifugal flow passage 11 formed by the centrifugal pump vane 4, the convex curved surface 52A of the disc portion 5, and the concave curved surface 31A of the hub portion 3, for flowing a liquid introduced along the axis direction X outward in the radial direction.

As depicted in FIG. 2, the pump apparatus 1 according to some embodiments includes the rotational shaft 2, the hub portion 3 mounted to the rotational shaft 2, the centrifugal pump vane 4 mounted to the circumferential surface 31 of the hub portion 3, the annular disc portion 5 mounted to the tip end 41 of the centrifugal pump vane 4, and the axial turbine blade 6 mounted to the outer circumferential surface 51 of the annular disc portion 5. At the radially inner side of the annular disc portion 5, a liquid flow passage 12 through which the liquid flowing from the first side (front side XF) toward the second side (rear side XR) in the axis direction X of the rotational shaft 2 flows into the centrifugal pump vane 4 is formed. At the radially outer side of the annular disc portion 5, a gas flow passage 13 through which a gas flowing from the second side (rear side XR) toward the first side (front side XF) in the axis direction X of the rotational shaft 2 passes through the axial turbine blade 6 is formed.

As depicted in FIG. 2, the liquid flow passage 12 is connected to the centrifugal flow passage 11 from the front side XF. The liquid flowing through the liquid flow passage 12 toward the rear side XR is introduced into the centrifugal flow passage 11 from the front side XF. The axial turbine blade 6 rotates as a gas flowing from the rear side XR toward the front side XF is introduced into the axial turbine blade 6. Each of the hub portion 3, the centrifugal pump vane 4, and the annular disc portion 5 rotates in conjunction with rotation of the axial turbine blade 6. The liquid is sucked into the centrifugal flow passage 11 from the liquid flow passage 12 and pressurized by a suction force generated by rotating the hub portion 3, the centrifugal pump vane 4, and the annular disc portion 5.b The pump apparatus 1 includes an axial turbine 10A including the axial turbine blade 6, and a centrifugal pump 10B including the centrifugal pump vane 4.

With the above configuration, the pump apparatus 1 includes the centrifugal pump vane 4 mounted to each of the hub portion 3 and the annular disc portion 5, and the axial turbine blade 6 mounted to the outer circumferential surface 51 of the annular disc portion 5. In the above pump apparatus 1, the axial turbine 10A and the centrifugal pump 10B are integrated, and thereby it is possible to reduce the length of the rotational shaft 2 in the axis direction X. By reducing the length of the pump apparatus 1 in the axis direction X, it is possible to make the pump apparatus 1 compact, and reduce the size and weight of the pump apparatus 1.

Furthermore, with the above configuration, the pump apparatus 1 has the liquid flow passage 12 formed at the radially inner side of the annular disc portion 5, through which the liquid flowing from the front side XF toward the rear side XR flows into the centrifugal pump vane 4, and the gas flow passage 13 formed at the radially outer side of the annular disc portion 5, through which the gas flowing from the rear side XR toward the front side XF passes through the axial turbine blade 6. In this case, each of the axial turbine blade 6 and the annular disc portion 5 is cooled by the liquid that flows through the liquid flow passage 12 and passes the centrifugal pump vane 4, and thus it is possible to improve the heat resistance thereof. Furthermore, the heat of the gas flowing through the gas flow passage 13 is insulated by the liquid that flows through the liquid flow passage 12 and passes through the centrifugal pump vane 4, and thus it is possible to suppress transfer of the heat to the hub portion 3 or the rotational shaft 2 via the axial turbine blade 6 and the annular disc portion 5. By suppressing transfer of the heat of the gas flowing through the gas flow passage 13 to the rotational shaft 2, it is possible to suppress thermal degradation and performance deterioration of the bearings and seals mounted to the rotational shaft 2. Accordingly, it is not necessary to provide the pump apparatus 1 with a cooling structure for cooling the bearings and seals mounted to the rotational shaft 2, and thus it is possible to suppress an increase in the size, weight, and number of parts of the pump apparatus 1, thereby suppressing deterioration of the reliability caused by an increase in the size, weight, and number of parts of the pump apparatus 1.

In some embodiments, as depicted in FIG. 2, the above described pump apparatus 1 further includes a body-side casing 7 which accommodates the hub portion 3, the centrifugal pump vane 4, the annular disc portion 5, and the axial turbine blade 6 rotatably, and an inlet-side casing 8 fastened to the front side XF of the body-side casing 7. Inside the inlet-side casing 8, a liquid introduction passage 81 for introducing a liquid into the centrifugal pump vane 4, and a gas discharge passage 82 formed at a radially outer side of the liquid introduction passage 81 for discharging a gas after passing through the axial turbine blade 6 are formed.

The above described liquid flow passage 12 includes a narrowing flow passage 12A connected to the centrifugal flow passage 11, and the liquid introduction passage 81 connected to the narrowing flow passage 12A. In the depicted embodiment, the inner circumferential surface 52 of the annular disc portion 5 includes the above described convex curved surface 52A and a tapered surface 52B formed at the front side of the front end 521 of the convex curved surface 52A. The tapered surface 52B forms the narrowing flow passage 12A whose flow-passage area orthogonal to the axis LA decreases toward the rear side XR. The liquid introduction passage 81 includes an inlet-side narrowing flow passage 81A whose flow-passage area orthogonal to the axis LA decreases toward the rear side XR. The inlet-side narrowing flow passage 81A has an outlet opening end 84 formed on the end surface 83 at the rear side XR of the inlet-side casing 8. The inlet-side narrowing flow passage 81A is connected to the narrowing flow passage 12A through the outlet opening end 84.

A liquid introduction hole 85 for introducing a liquid to the liquid introduction passage 81 is formed on the inlet-side casing 8. The liquid introduction hole 85 has an inner opening end 851 formed on an inner surface 811 forming the liquid introduction passage 81 of the inlet-side casing 8, and an outer opening end 852 formed on the outer circumferential surface 86 of the inlet-side casing 8. The liquid introduction hole 85 is formed at a position offset from the gas discharge passage 82 in the circumferential direction of the rotational shaft 2. The liquid introduced from the outer opening end 852 flows through the liquid introduction passage 81 and the narrowing flow passage 12A toward the rear side XR, and is guided to the centrifugal pump vane 4 after the flow of the liquid is narrowed.

Inside the body-side casing 7, a liquid discharge passage 71 for discharging a liquid after passing through the centrifugal pump vane 4, and a gas introduction passage 72 for introducing a gas into the axial turbine blade 6 are formed. The body-side casing 7 includes a liquid discharge passage forming portion 710 that forms the liquid discharge passage 71, and a gas introduction passage forming portion 720 that forms the gas introduction passage 72.

The liquid discharge passage 71 includes a scroll flow passage 71A formed into a scroll shape at the radially outer side of the above described centrifugal flow passage 11. The liquid discharge passage 71 has a liquid discharge port 74 formed on the outer circumferential surface 73 of the body-side casing 7. The liquid discharge port 74 has an opening into the outer side in the radial direction. The liquid after passing through the centrifugal pump vane 4 flows through the liquid discharge passage 71, and then is discharged outside the body-side casing 7 from the liquid discharge port 74.

The above described gas flow passage 13 includes a gas introduction passage 72 and a gas discharge passage 82. The gas introduced from the gas introduction port (not depicted) flows through the gas introduction passage 72, and then is guided to the axial turbine blade 6. The gas after passing through the axial turbine blade 6 flows through the gas discharge passage 82, and is discharged from a gas discharge port (not depicted).

In the illustrated embodiment, a nozzle (stator vane) 14 of the axial turbine 10A is disposed in the gas introduction passage 72. The axial turbine 10A may be any one of an impulse turbine, a reaction turbine, or an impulse-reaction turbine.

In the illustrated embodiment, the body-side casing 7 includes a first flange portion 76 protruding outward in the radial direction from the end portion 75 at the front side XF. The inlet-side casing 8 includes a second flange portion 87 protruding outward in the radial direction from the outer circumferential surface 86 at the rear side XR. The inlet-side casing 8 is fastened to the body-side casing 7 with a fastening member 15 (fastening bolt in the illustrated example) fastening the first flange portion 76 and the second flange portion 87.

With the above configuration, the pump apparatus 1 includes the body-side casing 7 and the inlet-side casing 8 fastened to the front side XF of the body-side casing 7, and inside the inlet-side casing 8, the liquid introduction passage 81 is formed, and the gas discharge passage 82 is formed at the radially outer side of the liquid introduction passage 81. In this case, it is possible to reduce the length of the inlet-side casing 8 in the axis direction X, and thereby make the pump apparatus 1 compact and reduce the size and weight of the pump apparatus 1.

In some embodiments, the above described pump apparatus 1 is configured such that, when the gas and the liquid described above are at a design flow rate, the pressure P3 of the gas at the inlet of the axial turbine blade 6 (the pressure between the nozzle 14 and the axial turbine blade 6, or inter-blade pressure) is higher than the pressure P1 of the liquid flowing through the liquid flow passage 12 (pump inlet pressure), and lower than the pressure P2 of the liquid after passing through the centrifugal pump vane 4 (pump outlet pressure).

The liquid that flows through the liquid flow passage 12 and passes the centrifugal pump vane 4 is applied with a centrifugal force and pressurized from drive of the pump apparatus 1. In a normal pump, a large amount of leak of the liquid occurs due to the pressure difference between the pump outlet pressure P2 and the pump inlet pressure P1. With the above configuration, the leak amount of the liquid in the pump apparatus 1 corresponds to the pressure difference between the pump outlet pressure P2 and the inter-blade pressure P3, which is smaller than the pressure difference between the pump outlet pressure P2 and the pump inlet pressure P1. Accordingly, it is possible to reduce the leak amount of the liquid in the pump apparatus 1 compared to a normal pump.

(Through Hole of the Disc Portion)

Figure 3:
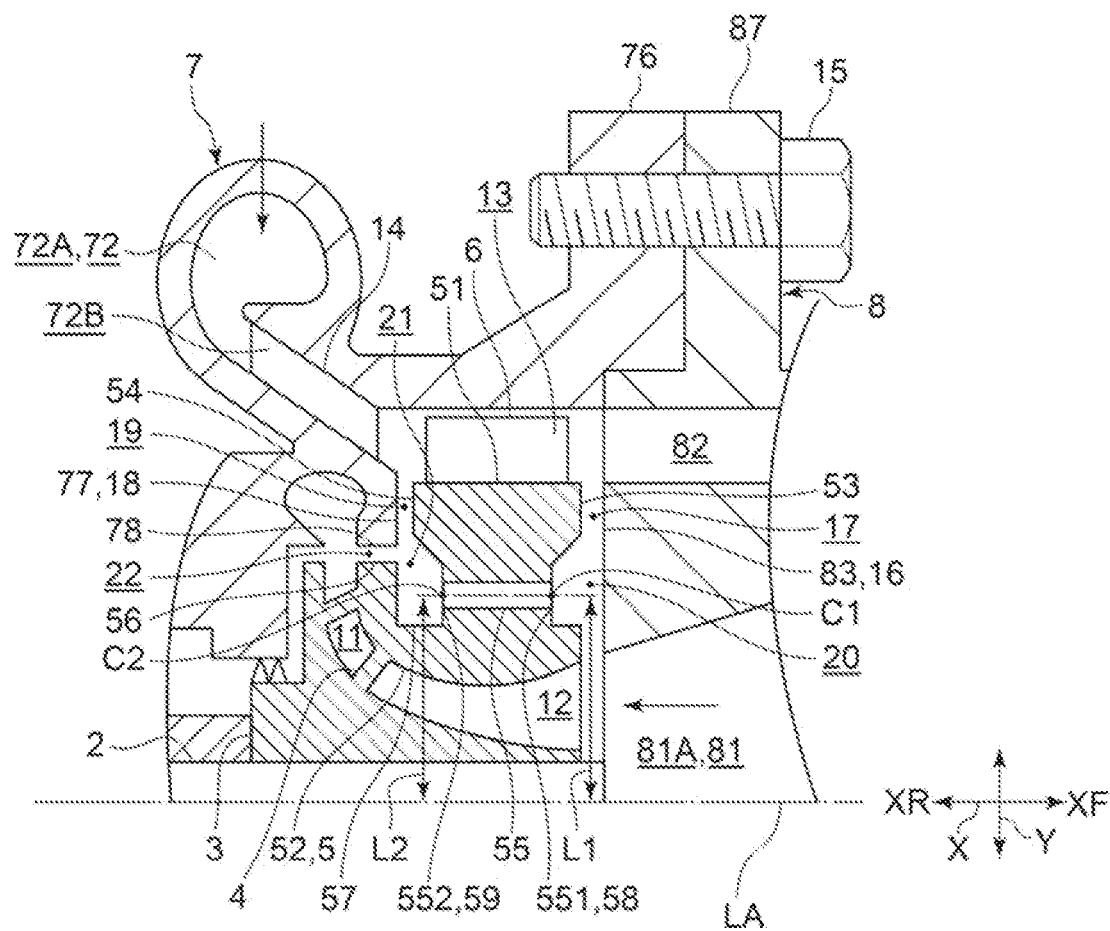
FIG. 3 is a schematic cross-sectional diagram of the vicinity of an annular disc portion of a pump apparatus according to an embodiment of the present disclosure, taken along the axis of the pump apparatus.

FIG. 3 is a schematic cross-sectional diagram of the vicinity of an annular disc portion of a pump apparatus according to an embodiment of the present disclosure, taken along the axis of the pump apparatus.

In some embodiments, as depicted in FIG. 3, the above described pump apparatus 1 has a front-side gap (first-side gap) 17 formed between the end surface 53 at the front side XF of the annular disc portion 5 and the stationary wall 16, and a rear-side gap (second-side gap) 19 formed between the end surface 54 at the rear side XR of the annular disc portion 5 and the stationary wall 18. The annular disc portion 5 has a through hole 55 formed through the annular disc portion 5 along the axis direction X of the rotational shaft 2. The through hole 55 brings the front-side gap 17 or the front-side space (first-side space) 20 connected to the front-side gap 17 and the rear-side gap 19 or the rear-side space (second-side space) 21 connecting to the rear-side gap 19 into communication.

In the illustrated embodiment, the end surface 53 of the annular disc portion 5 extends along the radial direction, at the radially inner side in the radial direction from the front end of the outer circumferential surface 51 to which the axial turbine blade 6 is mounted. The stationary wall 16 includes an end surface 83 at the rear side XR of the inlet-side casing 8 positioned so as to face the end surface 53. That is, in the illustrated embodiment, the front-side gap 17 is formed between the end surface 53 and the end surface 83. The front-side gap 17 is connected to the gas flow passage 13 at the front side (downstream side) of the axial turbine blade 6, and at the rear side (upstream side) of the gas discharge passage 82.

The front-side space 20 is a space formed at the radially inner side of the front-side gap 17, and a space formed between the annular disc portion 5 and the inlet-side casing 8. The front-side space 20 is connected to the liquid flow passage 12 formed at the radially inner side of the front-side space 20.

In the illustrated embodiment, the end surface 54 of the annular disc portion 5 extends along the radial direction, at the radially inner side in the radial direction from the rear end of the outer circumferential surface 51 to which the axial turbine blade 6 is mounted. The stationary wall 18 includes an end surface 77 at the front side XF of the body-side casing 7 positioned so as to face the end surface 54. That is, in the illustrated embodiment, the rear-side gap 19 is formed between the end surface 54 and the end surface 77. The rear-side gap 19 is connected to the gas flow passage 13 at the front side (downstream side) of the nozzle 14, and at the rear side (upstream side) of the axial turbine blade 6.

The annular disc portion 5 includes a rear side outer circumferential surface 56 positioned at the rear side XR of the outer circumferential surface 51 to which the axial turbine blade 6 is mounted, and at the inner side of the outer circumferential surface 51 in the radial direction, and an annular recessed portion 57 recessed inward in the radial direction from the rear side outer circumferential surface 56 between the outer circumferential surface 51 and the rear side outer circumferential surface 56 in the axis direction X. The rear-side space 21 is a space formed at the radially inner side of the rear-side gap 19, and includes a space facing the annular recessed portion 57. The rear-side space 21 is in communication with the outlet of the centrifugal flow passage 11 through the gap 22 formed between the rear side outer circumferential surface 56 and the inner circumferential surface 78 of the body-side casing 7 facing the rear side outer circumferential surface 56. The inner circumferential surface 78 extends along the axis direction X at the rear side XR from the inner end of the end surface 77.

The through hole 55 has a front-side opening end 551 formed at the front side XF of the disc portion 5, and a rear-side opening end 552 formed at the rear side XR of the disc portion 5. In the illustrated embodiment, the front-side opening end 551 is formed on a surface 58 continuing to the radially inner side of the end surface 53 of the disc portion 5, and the rear-side opening end 552 is formed on a surface 59 continuing to the radially inner side of the end surface 54 of the disc portion 5. The front-side opening end 551 is connected to the front-side space 20, and the rear-side opening end 552 is connected to the rear-side space 21. Furthermore, in some embodiments, the front-side opening end 551 may be formed on the end surface 53 so as to connect to the front-side gap 17, or the rear-side opening end 552 may be formed on the end surface 54 so as to connect to the rear-side gap 19.

In the illustrated embodiment, the through hole 55 is configured such that the distance L1 between the center C1 of the front-side opening end 551 and the axis LA of the rotational shaft 2 is equal to the distance L2 between the center C2 of the rear-side opening end 552 and the axis LA.

With the above configuration, the liquid that passes the centrifugal pump vane 4 is applied with a centrifugal force and pressurized from drive of the pump apparatus 1. A part of the pressurized liquid flows into the rear-side gap 19 and the rear-side space 21. A part of the liquid flowing into the rear-side gap 19 and the rear-side space 21 passes through the through hole 55 and is sent to the front-side gap 17 and the front-side space 20, driven by the pump apparatus 1. In this case, it is possible to cool a front section of each of the axial turbine blade 6 and the annular disc portion 5 with the liquid sent to the front-side gap 17 and the front-side space 20. Furthermore, with the above configuration, since the liquid existing in the rear-side gap 19 and the rear-side space 21 flows into the front-side gap 17 and the front-side space 20 through the through hole 55, it is possible to improve the pressure of the front-side gap 17 and the front-side space 20 compared to a case where the through hole 55 is not formed. By improving the pressure of the front-side gap 17 and the front-side space 20, it is possible to suppress inflow of the gas into the liquid flow passage 12 after passing through the axial turbine blade 6 and the front-side gap 17 and the front-side space 20. By suppressing inflow of the gas into the liquid flow passage 12 after passing through the axial turbine blade 6, it is possible to suppress occurrence of cavitation in the liquid flow passage 12 or the centrifugal flow passage 11.

Figure 4:
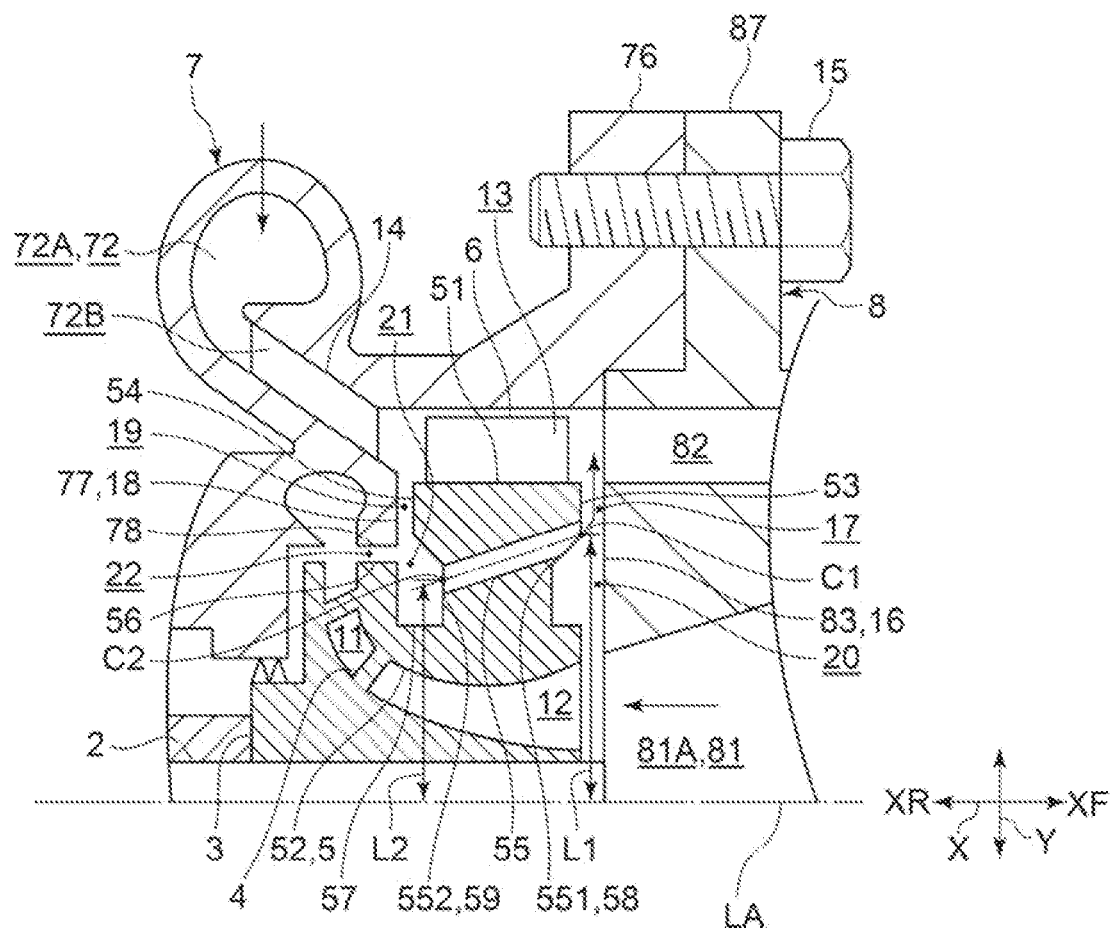
FIG. 4 is a schematic cross-sectional diagram of the vicinity of an annular disc portion of a pump apparatus according to an embodiment of the present disclosure, taken along the axis of the pump apparatus.

FIG. 4 is a schematic cross-sectional diagram schematically showing the vicinity of an annular disc portion of a pump apparatus according to an embodiment of the present disclosure, taken along the axis of the pump apparatus.

In some embodiments, as depicted in FIG. 4, the above described through hole 55 is configured such that the distance L1 between the center C1 of the front-side opening end 551 and the axis LA of the rotational shaft 2 is greater than the distance L2 between the center C2 of the rear-side opening end 552 and the axis LA. In the illustrated embodiment, the through hole 55 is inclined toward the radially outer side with distance toward the front side XF.

With the above configuration, the through hole 55 is configured such that the distance L1 is greater than the distance L2. In this case, compared to a case in which the distance L1 and the distance L2 are the same, movement of the liquid existing in the rear-side gap 19 and the rear-side space 21 to the front-side gap 17 and the front-side space 20 through the through hole 55 in response to drive of the pump apparatus 1 is promoted, and thus it is possible to cool a section of each of the axial turbine blade 6 and the annular disc portion 5 at the front side XF effectively.

Figure 5:
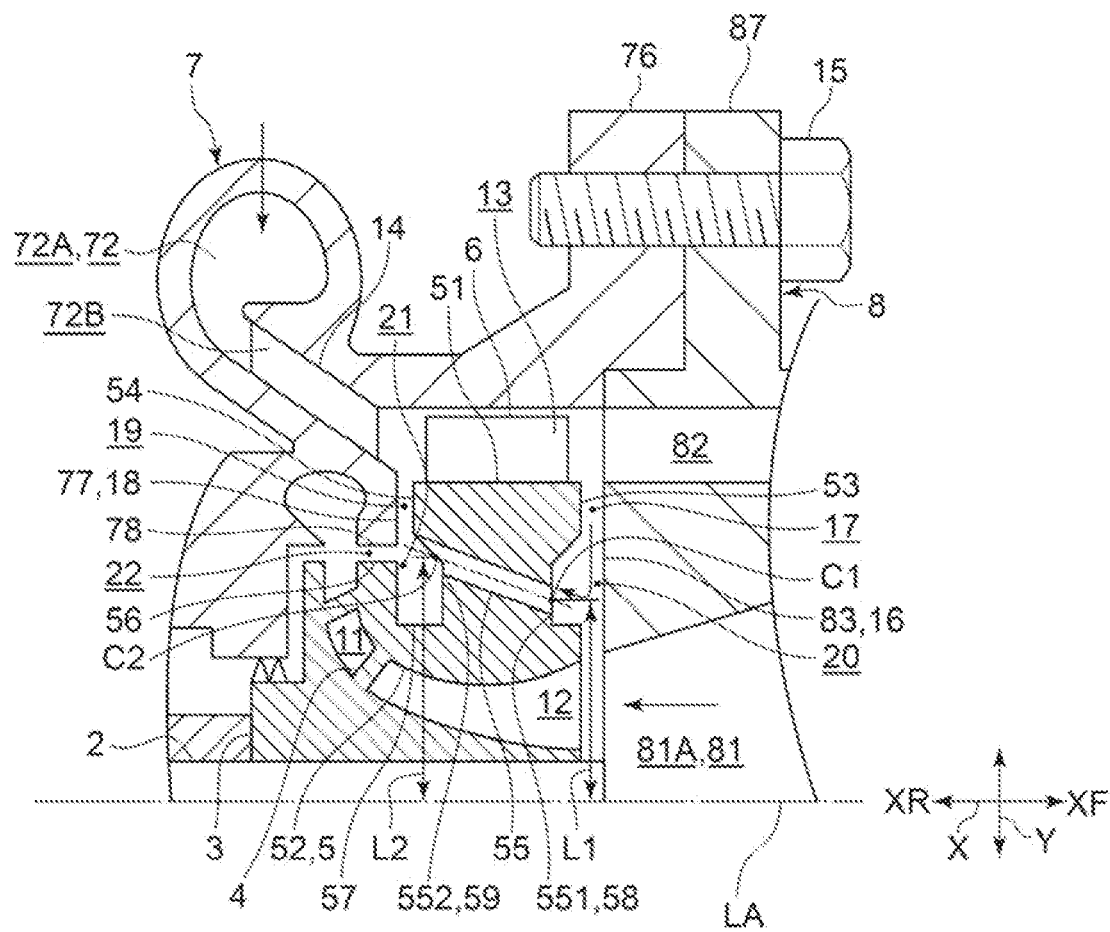
FIG. 5 is a schematic cross-sectional diagram of the vicinity of an annular disc portion of a pump apparatus according to an embodiment of the present disclosure, taken along the axis of the pump apparatus.

FIG. 5 is a schematic cross-sectional diagram schematically showing the vicinity of an annular disc portion of a pump apparatus according to an embodiment of the present disclosure, taken along the axis of the pump apparatus.

In some embodiments, as depicted in FIG. 5, the above described through hole 55 is configured such that the distance L1 between the center C1 of the front-side opening end 551 and the axis LA of the rotational shaft 2 is smaller than the distance L2 between the center C2 of the rear-side opening end 552 and the axis LA. In the illustrated embodiment, the through hole 55 is inclined toward the radially outer side with distance toward the rear side XR.

With the above configuration, the through hole 55 is configured such that the distance L1 is smaller than the distance L2. In this case, with the pumping effect upon driving of the pump apparatus 1, it is possible to return the gas having flown into the front-side gap 17 and the front-side space 20 after passing through the axial turbine blade 6 to the inlet side of the axial turbine blade 6 via the through hole 55, the rear-side space 21 and the rear-side gap 19. By returning the gas after passing through the axial turbine blade 6, it is possible to reduce the leak amount of the liquid after passing through the centrifugal pump vane 4 to the rear-side gap 19 and the rear-side space 21, and thus it is possible to improve the efficiency of the pump function of the pump apparatus 1. Furthermore, by reducing the leak amount of the liquid after passing through the centrifugal pump vane 4 to the rear-side gap 19 and the rear-side space 21, it is possible to reduce agitation loss of the liquid existing in the gap (front-side gap 17, rear-side gap 19) and the space (front-side space 20, rear-side space 21) facing the annular disc portion 5 due to the annular disc portion 5, and thus it is possible to improve the efficiency of the axial turbine 10A of the pump apparatus 1. Thus, it is possible to improve the overall performance of the pump apparatus 1.

(Labyrinth Seal)

Figure 6:
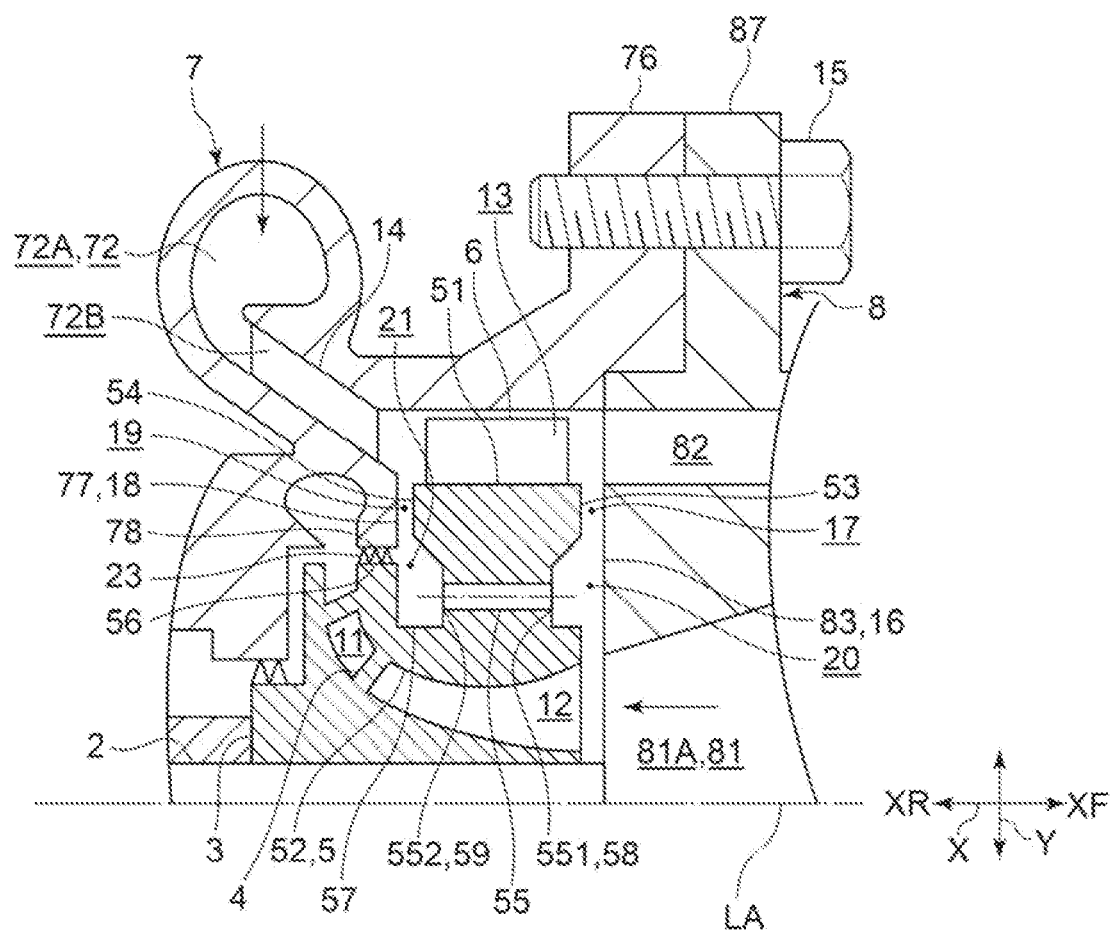
FIG. 6 is a schematic cross-sectional diagram of the vicinity of an annular disc portion of a pump apparatus according to an embodiment of the present disclosure, taken along the axis of the pump apparatus.

FIG. 6 is a schematic cross-sectional diagram schematically showing the vicinity of an annular disc portion of a pump apparatus according to an embodiment of the present disclosure, taken along the axis of the pump apparatus.

In some embodiments, as depicted in FIG. 6, the above described pump apparatus 1 has the above described rear-side gap (second-side gap) 19 formed between the end surface 54 at the rear side XR of the annular disc portion 5 and the stationary wall 18. The pump apparatus 1 includes the above described body-side casing 7 that accommodates the hub portion 3, the centrifugal pump vane 4, the annular disc portion 5, and the axial turbine blade 6 rotatably, and a labyrinth seal 23 which seals the gap between the annular disc portion 5 and the body-side casing 7 at the rear side XR of the rear-side gap 19.

In the illustrated embodiment, the labyrinth seal 23 seals the gap between the rear side outer circumferential surface 56 of the above described disc portion 5, and the inner circumferential surface 78 of the above described body-side casing 7.

With the above configuration, at the rear side XR of the rear-side gap 19, by sealing the gap between the annular disc portion 5 and the body-side casing 7 with the labyrinth seal 23, it is possible to reduce the leak amount of the liquid after passing through the centrifugal pump vane 4 to the rear-side gap 19 and the rear-side space 21, and thus it is possible to improve the efficiency of the centrifugal pump 10B of the pump apparatus 1. Furthermore, by reducing the leak amount of the liquid after passing through the centrifugal pump vane 4 to the rear-side gap 19 and the rear-side space 21, it is possible to reduce agitation loss of the liquid existing in the gap (front-side gap 17, rear-side gap 19) and the space (front-side space 20, rear-side space 21) facing the annular disc portion 5, and thus it is possible to improve the efficiency of the axial turbine 10A of the pump apparatus 1. Thus, it is possible to improve the overall performance of the pump apparatus 1.

Furthermore, by reducing the leak amount of the liquid after passing through the centrifugal pump vane 4 to the rear-side gap 19 and the rear-side space 21, it is possible to suppress a pressure increase in the rear-side gap 19 and the rear-side space 21, and reduce the pressure difference between the rear-side gap 19 and the rear-side space 21 and the front-side gap 17 and the front-side space 20, and thus it is possible to reduce the thrust applied to the annular disc portion 5. Furthermore, the pump apparatus 1 is provided with the labyrinth seal 23 having a simplified structure to seal the gap between the annular disc portion 5 and the body-side casing 7, and thus it is possible to suppress an increase in the structural complexity, the size, and the weight of the pump apparatus 1.

(Inducer)

Figure 7:
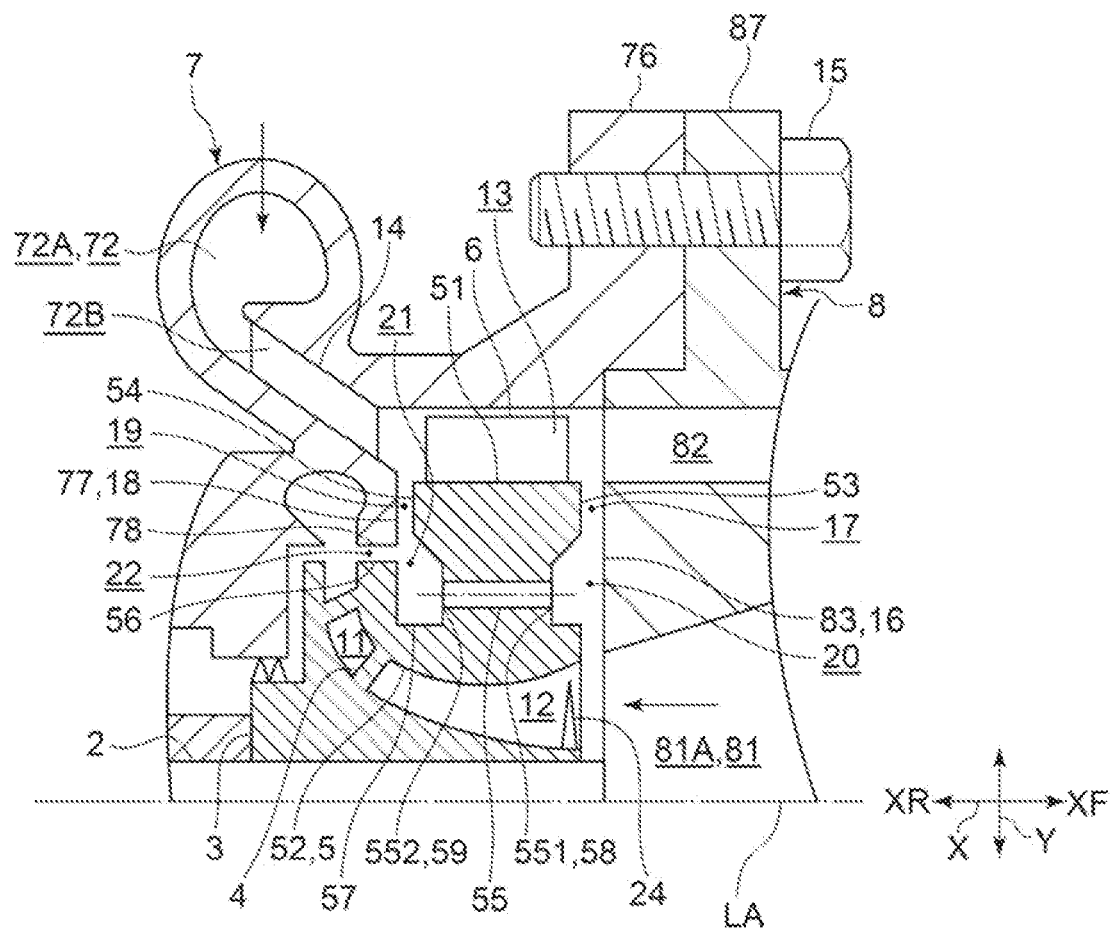
FIG. 7 is a schematic cross-sectional diagram of the vicinity of an annular disc portion of a pump apparatus according to an embodiment of the present disclosure, taken along the axis of the pump apparatus.
Figure 8:
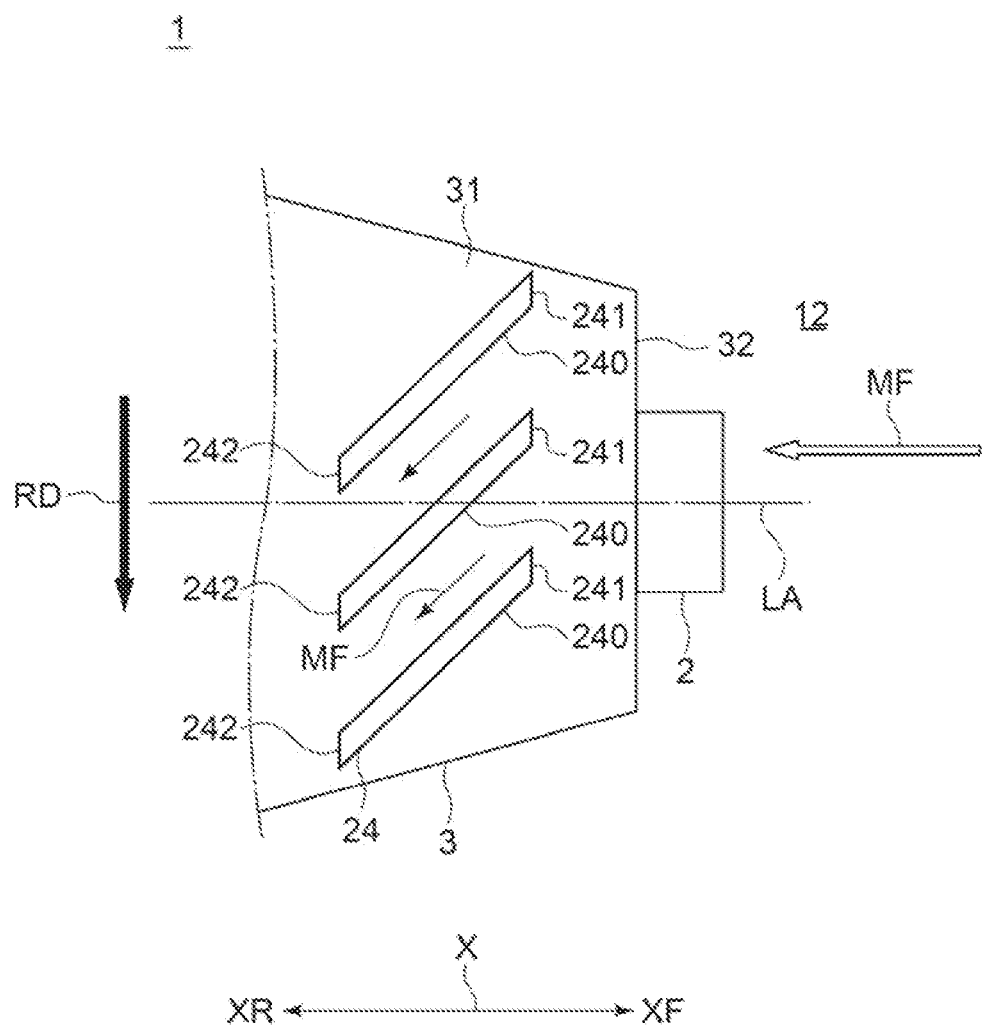
FIG. 8 is an explanatory diagram for describing an example of an inducer according to an embodiment of the present disclosure.

FIG. 7 is a schematic cross-sectional diagram schematically showing the vicinity of an annular disc portion of a pump apparatus according to an embodiment of the present disclosure, taken along the axis of the pump apparatus. FIG. 8 is an explanatory diagram for describing an example of an inducer according to an embodiment of the present disclosure. In FIG. 8, the hub portion 3 of the pump apparatus 1 is depicted schematically as seen from the outer side in the radial direction. The rotational direction RD indicates the rotational direction of the rotational shaft 2 at the front side of the axis LA in the drawing. MF indicates the flow of the liquid flowing through the liquid flow passage 12.

In some embodiments, the above described pump apparatus 1 includes, as depicted in FIG. 7, an inducer 24 protruding from the front side XF past the centrifugal pump vane 4 at the circumferential surface 31 of the hub portion 3. The inducer 24 is, as depicted in FIG. 8, configured to apply a pre-swirl to the liquid flowing into the centrifugal pump vane 4 in the rotational direction RD of the rotational shaft 2.

In the embodiment depicted in FIG. 8, the inducer 24 includes a plurality of guide vanes 240 arranged at intervals in the circumferential direction of the rotational shaft 2. Each of the guide vanes 240 is inclined such that a trailing edge 242 positioned at the rear side XR is positioned in the rotational direction RD compared to the leading edge 241 positioned at the front side XF. The liquid flowing through the liquid flow passage 12 is guided by the guide vanes 240 when passing between the guide vanes 240, and a velocity component directed toward the rotational direction RD is added to the flow MF of the liquid.

With the above configuration, the liquid flowing into the centrifugal pump vane 4 is applied with a pre-swirl in the rotational direction RD of the rotational shaft 2 by the inducer 24, and thus it is possible to suppress occurrence of cavitation. Accordingly, it is possible to suppress deterioration of the efficiency of the pump apparatus 1 due to occurrence of cavitation.

(Gas Introduction Passage)

Figure 9:
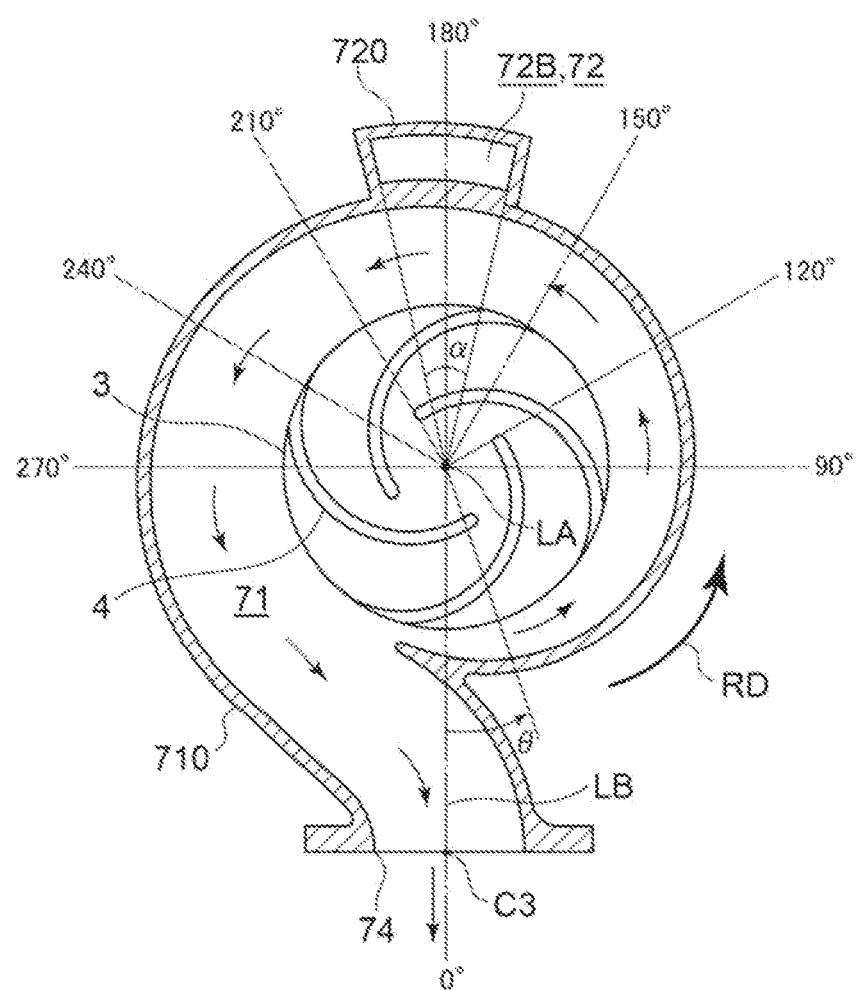
FIG. 9 is an explanatory diagram for describing an example of a gas introduction passage according to an embodiment of the present disclosure.

FIG. 9 is an explanatory diagram for describing an example of a gas introduction passage according to an embodiment of the present disclosure. In FIG. 9, the hub portion, the centrifugal pump vane, and the body-side casing are depicted schematically, as seen from the front side in the axis direction of the rotational shaft.

In some embodiments, the above described pump apparatus 1 includes, as depicted in FIG. 2, the body-side casing 7 with the above described gas introduction passage 72 formed inside thereof. The above described gas introduction passage 72 is formed partially in the circumferential direction of the rotational shaft 2.

With the above configuration, through the gas introduction passage 72, a gas is introduced into the axial turbine blade 6 from a part of the circumferential direction. With the axial turbine 10A of the pump apparatus 1 being a partial-feed turbine as described above, it is possible to suppress interference between the gas introduction passage 72 and the liquid discharge passage 71 for discharging the liquid after passing through the centrifugal pump vane 4. Specifically, it is possible to locate the side of the liquid discharge port 74 of the liquid discharge passage 71 with a large flow-passage area, in a range where the gas introduction passage 72 is not formed in the circumferential direction of the rotational shaft 2. In this case, it is possible to make the pump apparatus 1 compact and reduce the size and weight of the pump apparatus 1.

In some embodiments, as depicted in FIG. 9, when a is an angular range in which the gas introduction passage 72 extends in the circumferential direction of the rotational shaft 2, the angular range a is not smaller than zero angular degrees and not greater than 90 angular degrees. Preferably, the angular range a is not smaller than 10 angular degrees and not greater than 60 angular degrees, and more preferably, the angular range a is not smaller than 20 angular degrees and not greater than 30 angular degrees. In this case, it is possible to make the pump apparatus 1 compact and reduce the size and weight of the pump apparatus 1 while suppressing interference between the gas introduction passage 72 and the liquid discharge passage 71.

In some embodiments, in a cross section orthogonal to the axis LA as depicted in FIG. 9, when the angular position of the center C3 of the liquid discharge port 74 in the circumferential direction of the rotational shaft 2 is zero angular degrees and the downstream direction in the rotational direction RD of the rotational shaft 2 is the positive direction of the angular position θ in the circumferential direction, the above described gas introduction passage 72 exists within a range of $90° \leq \theta \leq 270°$. Preferably, the gas introduction passage 72 exists within a range of $120° \leq \theta \leq 240°$. More preferably, the gas introduction passage 72 exists within a range of $150° \leq \theta \leq 210°$. In this case, it is possible to make the pump apparatus 1 compact and reduce the size and weight of the pump apparatus 1 while suppressing interference between the gas introduction passage 72 and the liquid discharge passage 71.

In some embodiments, in the above described pump apparatus 1, as depicted in FIG. 2, the above described gas introduction passage 72 includes a scroll flow passage 72A disposed closer to the second side (rear side XR) than the axial turbine blade 6 so as to have a scroll shape, and an oblique introduction passage for introducing a gas from the scroll flow passage 72A to the axial turbine blade 6. The oblique introduction passage 72B is inclined toward the radially inner side with distance toward the first side (front side XF). In the depicted embodiment, the above described nozzle 14 is disposed in the oblique introduction passage 72B.

With the above configuration, the oblique introduction passage 72B is capable of increasing the pressure of the gas passing through the oblique introduction passage 72B inclined toward the radially inner side with distance toward the front side XF. By increasing the pressure of the gas introduced into the axial turbine blade 6, it is possible to suppress separation of the gas from the axial turbine blade 6, and thereby improve the efficiency of the axial turbine 10A of the pump apparatus 1. Furthermore, with the above configuration, the oblique introduction passage 72B is inclined toward the radially outer side with distance toward the rear side XR, and thus it is possible to suppress interference between the liquid discharge passage 71, and the oblique introduction passage 72B and the scroll flow passage 72A. Accordingly, it is possible to make the pump apparatus 1 compact and reduce the size and weight of the pump apparatus 1.

In some embodiments, as depicted in FIG. 1, the body-side casing 7 has a groove portion 722 between an outer circumferential surface 711 of the liquid discharge passage forming portion 710 closer to the rear side XR than the scroll flow passage 71A and an outer surface 721 at the radially inner side of the gas introduction passage forming portion 720, the groove portion 722 being recessed toward the front side XF. The groove portion 722 extends along the circumferential direction of the rotational shaft 2, and a gap is formed between the outer circumferential surface 711 and the outer surface 721. The gas introduction passage forming portion 720 is connected to the liquid discharge passage forming portion 710 from the radially outer side, at a position closer to the front side XF than the groove portion 722. The liquid discharge passage forming portion 710 has the above described scroll flow passage 71A at the radially inner side of the connection portion to the gas introduction passage forming portion 720. In the illustrated embodiment, the gas introduction passage forming portion 720 is provided integrally with the liquid discharge passage forming portion 710. In this case, when heat is transferred to the liquid discharge passage forming portion 710 from the gas introduction passage forming portion 720, the heat needs to pass a section of the liquid discharge passage forming portion 710 that is cooled by the scroll flow passage 71A, and thus it is possible to suppress transfer of heat to the liquid discharge passage forming portion 710, and the casing connected to the rear side XR of the liquid discharge passage forming portion 710, from the gas introduction passage forming portion 720 effectively. Accordingly, it is possible to suppress thermal degradation and performance deterioration of the seals and bearings housed inside the liquid discharge passage forming portion 710 and the casing connected to the rear side XR of the liquid discharge passage forming portion 710.

In some embodiments, as depicted in FIG. 1, the above described pump system 10 includes the above described pump apparatus 1, and one of a rotational force recovery apparatus 91 configured to recover the rotational force of the rotational shaft 2 or a rotational force application apparatus 92 configured to apply a rotational force to the rotational shaft 2. The rotational force recovery apparatus 91 or the rotational force application apparatus 92 is mounted to the rotational shaft 2.

In the illustrated embodiment, as depicted in FIG. 1, the above described pump system 10 includes a casing 93 which accommodates the rotational force recovery apparatus 91 or the rotational force application apparatus 92, a front-side bearing 94 mounted to the rotational shaft 2 at a position closer to the front side XF than the rotational force recovery apparatus 91 or the rotational force application apparatus 92, and a rear-side bearing 95 mounted to the rotational shaft 2 at a position closer to the rear side XR than the rotational force recovery apparatus 91 or the rotational force application apparatus 92. In an embodiment, the rotational force recovery apparatus 91 consists of a generator. Furthermore, in an embodiment, the rotational force application apparatus 92 consists of an electric motor.

The casing 93 includes a front-side bearing support portion 931 which supports the front-side bearing 94 from the radially outer side, and a rear-side bearing support portion 932 which supports the rear-side bearing 95 from the radially outer side. In the illustrated embodiment, the casing 93 is connected to the rear side XR of the liquid discharge passage forming portion 710, and not to the gas introduction passage forming portion 720.

With the above configuration of the pump system 10, by reducing the length of the pump apparatus 1 in the axis direction X, it is possible to make the pump system 10 compact, and reduce the size and weight of the pump system 10.

In some embodiments, the above described pump apparatus 1 consists of a fuel pump apparatus for feeding a liquid fuel to a non-depicted internal combustion engine. The pump apparatus 1 is configured to feed a liquid fuel to a non-depicted internal combustion engine by driving the centrifugal pump 10B.

Embodiments of the present invention were described in detail above, but the present invention is not limited thereto, and various amendments and modifications may be implemented.

The contents described in the above respective embodiments can be understood as follows, for instance.

(1) According to at least one embodiment of the present disclosure, a pump apparatus (1) includes: a rotational shaft (2); a hub portion (3) mounted to the rotational shaft (2); a centrifugal pump vane (4) mounted to a circumferential surface (31) of the hub portion (3); an annular disc portion (5) mounted to a tip end (41) of the centrifugal pump vane (4); and an axial turbine blade (6) mounted to an outer circumferential surface (51) of the annular disc portion (5). A liquid flow passage (12) through which a liquid flowing from a first side (front side XF) toward a second side (rear side XR) in an axis direction (X) of the rotational shaft (2) flows into the centrifugal pump vane (4) is formed at a radially inner side of the annular disc portion (5), and a gas flow passage (13) through which a gas flowing from the second side (rear side XR) toward the first side (front side XF) passes through the axial turbine blade (6) is formed at a radially outer side of the annular disc portion (5).

According to the above configuration (1), the pump apparatus includes the centrifugal pump vane mounted to each of the hub portion and the annular disc portion, and the axial turbine blade mounted to the outer circumferential surface of the annular disc portion. In such a pump apparatus, the axial turbine and the centrifugal pump are integrated, and thereby it is possible to reduce the length of the rotational shaft in the axis direction. By reducing the length of the pump apparatus in the axis direction, it is possible to make the pump apparatus compact, and reduce the size and weight of the pump apparatus.

Furthermore, with the above configuration (1), the pump apparatus has the liquid flow passage formed at the radially inner side of the annular disc portion, through which the liquid flowing from the first side toward the second side flows into the centrifugal pump vane, and the gas flow passage formed at the radially outer side of the annular disc portion, through which the gas flowing from the second side toward the first side passes through the axial turbine blade. In this case, each of the axial turbine blade and the annular disc portion is cooled by the liquid that flows through the liquid flow passage and passes the centrifugal pump vane, and thus it is possible to improve the heat resistance thereof. Furthermore, the heat of the gas flowing through the gas flow passage is insulated by the liquid that flows through the liquid flow passage and passes through the centrifugal pump vane, and thus it is possible to suppress transfer of the heat to the hub portion or the rotational shaft via the axial turbine blade and the annular disc portion. By suppressing transfer of the heat of the gas flowing through the gas flow passage to the rotational shaft, it is possible to suppress thermal degradation and performance deterioration of the bearings and seals mounted to the rotational shaft. Accordingly, it is not necessary to provide the pump apparatus with a cooling structure for cooling the bearings and seals mounted to the rotational shaft, and thus it is possible to suppress an increase in the size, weight, and number of parts of the pump apparatus, thereby suppressing deterioration of the reliability due to an increase in the size, weight, and number of parts of the pump apparatus.

(2) In some embodiments, the pump apparatus (1) described in the above (1) further includes: a body-side casing (7) which accommodates the hub portion (3), the centrifugal pump vane (4), the annular disc portion (5), and the axial turbine blade (6) rotatably; and an inlet-side casing (8) fastened to the first side (front side XF) of the body-side casing (7). The inlet-side casing (7) has, formed inside thereof, a liquid introduction passage (81) for introducing the liquid to the centrifugal pump vane (4), and a gas discharge passage (82) for discharging the gas after passing through the axial turbine blade (6), the gas discharge passage being formed at a radially outer side of the liquid introduction passage (81).

With the above configuration (2), the pump apparatus includes the body-side casing and the inlet-side casing fastened to the first side of the body-side casing, and inside the inlet-side casing, the liquid introduction passage and the gas discharge passage formed at the radially outer side of the liquid introduction passage are formed. In this case, it is possible to reduce the length of the inlet-side casing in the axis direction, and thereby make the pump apparatus compact and reduce the size and weight of the pump apparatus.

(3) In some embodiments, in the pump apparatus (1) described in the above (1) or (2), a first-side gap (front-side gap 17) is formed between an end surface (53) of the annular disc portion (5) at the first side (front side XF) and a stationary wall (16, end surface 83), a second-side gap (rear-side gap 19) is formed between an end surface (54) of the annular disc portion (5) at the second side (rear side XR) and the stationary wall (18, end surface 77), and the annular disc portion (5) has a through hole (55) formed therein, the through hole (55) being formed through the annular disc portion (5) along the axis direction (X) of the rotational shaft (2) and bringing the first-side gap or a first-side space (front-side space 20) communicating with the first-side gap and the second-side gap or a second-side space (rear-side space 21) communicating with the second-side gap into communication.

With the above configuration (3), the liquid that passes the centrifugal pump vane is applied with a centrifugal force and pressurized from drive of the pump apparatus. A part of the pressurized liquid flows into the second-side gap and the second-side space. A part of the liquid flowing into the second-side gap and the second-side space passes through the through hole and is sent to the first-side gap and the first-side space, driven by the pump apparatus. In this case, it is possible to cool the first-side section of each of the axial turbine blade and the annular disc portion with the liquid sent to the first-side gap and the first-side space. Furthermore, with the above configuration, since the liquid existing in the second-side gap and the second-side space flows into the first-side gap and the first-side space through the through hole, it is possible to improve the pressure of the first-side gap and the first-side space compared to a case where the through hole is not formed. By improving the pressure of the first-side gap and the first-side space, it is possible to suppress inflow of the gas into the liquid flow passage after passing through the axial turbine blade and passing the first-side gap and the first-side space. By suppressing inflow of the gas into the liquid flow passage after passing through the axial turbine blade, it is possible to suppress occurrence of cavitation in the liquid flow passage or the centrifugal flow passage.

(4) In some embodiments, in the pump apparatus (1) described in the above (3), the through hole (55) has a first-side opening end (front-side opening end 551) formed at the first side (front side XF) of the annular disc portion (5) and a second-side opening end (rear-side end opening end 552) formed at the second side (rear side XR) of the annular disc portion (5), and a distance L1 between a center (C1) of the first-side opening end (front-side opening end 551) and an axis of the rotational shaft is greater than a distance L2 between a center (C2) of the second-side opening end (rear-side opening end 552) and the axis of the rotational shaft.

With the above configuration (4), the through hole is configured such that the distance L1 is greater than the distance L2. In this case, compared to a case in which the distance L1 and the distance L2 are the same, movement of the liquid existing in the second-side gap and the second-side space to the first-side gap and the first-side space through the through hole in response to drive of the pump apparatus is promoted, and thus it is possible to cool the first-side section of each of the axial turbine blade and the annular disc portion effectively.

(5) In some embodiments, in the pump apparatus (1) described in the above (3), the through hole (55) has a first-side opening end (front-side opening end 551) formed at the first side (front side XF) of the annular disc portion (5) and a second-side opening end (rear-side end opening end 552) formed at the second side (rear side XR) of the annular disc portion (5), and a distance L1 between a center (C1) of the first-side opening end (front-side opening end 551) and an axis of the rotational shaft is smaller than a distance L2 between a center (C2) of the second-side opening end (rear-side opening end 552) and the axis of the rotational shaft.

With the above configuration (5), the through hole is configured such that the distance L1 is smaller than the distance L2. In this case, with the pumping effect at the time of driving of the pump apparatus, it is possible to return the gas having flown into the first-side gap and the first-side space after passing through the axial turbine blade to the inlet side of the axial turbine blade via the through hole, the second-side space and the second-side gap. By returning the gas after passing through the axial turbine blade, it is possible to reduce the leak amount of the liquid after passing through the centrifugal pump vane to the second-side gap and the second-side space, and thus it is possible to improve the efficiency of the pump function of the pump apparatus. Furthermore, by reducing the leak amount of the liquid after passing through the centrifugal pump vane to the second-side gap and the second-side space, it is possible to reduce agitation loss of the liquid existing in the gap or the space facing the annular disc portion due to the annular disc portion, and thus it is possible to improve the efficiency of the turbine function of the pump apparatus. Thus, it is possible to improve the overall performance of the pump apparatus.

(6) In some embodiments, in the pump apparatus (1) described in any one of the above (1) to (5), a second-side gap (rear-side gap 19) is formed between an end surface (54) of the annular disc portion (5) at the second side (rear-side XR) and a stationary wall (18, end surface 77), and the pump apparatus (1) includes: a body-side casing (7) which accommodates the hub portion (3), the centrifugal pump vane (4), the annular disc portion (5), and the axial turbine blade (6) rotatably; and a labyrinth seal (23) which seals a gap between the annular disc portion (5) and the body-side casing (7) at a position closer to the second side (rear-side XR) than the second-side gap (rear-side gap 19).

With the above configuration (6), at the second side of the second-side gap, by sealing the gap between the annular disc portion and the body-side casing with the labyrinth seal, it is possible to reduce the leak amount of the liquid after passing through the centrifugal pump vane to the second-side gap and the second-side space and thus it is possible to improve the efficiency of the centrifugal pump of the pump apparatus. Furthermore, by reducing the leak amount of the liquid after passing through the centrifugal pump vane to the second-side gap and the second-side space, it is possible to reduce agitation loss of the liquid existing in the gap or the space facing the annular disc portion, and thus it is possible to improve the efficiency of the axial turbine of the pump apparatus. Thus, it is possible to improve the overall performance of the pump apparatus.

Furthermore, by reducing the leak amount of the liquid after passing through the centrifugal pump vane to the second-side gap and the second-side space, it is possible to suppress a pressure increase in the second-side gap and the second-side space, and reduce the pressure difference between the second-side gap and the second-side space and the first-side gap and the first-side space, and thus it is possible to reduce the thrust applied to the annular disc portion. Furthermore, the pump apparatus is provided with the labyrinth seal having a simplified structure to seal the gap between the annular disc portion and the body-side casing, and thus it is possible to suppress an increase in the structural complexity, the size, and the weight of the pump apparatus.

(7) In some embodiments, the pump apparatus (1) described in any one of the above (1) to (6) further includes an inducer (24) formed on the circumferential surface (31) of the hub portion (3) at a position closer to the first side (front side XF) than the centrifugal pump vane (4), the inducer (24) being configured to apply a pre-swirl, in a rotational direction (RD) of the rotational shaft (2), to the liquid flowing into the centrifugal pump vane (4).

With the above configuration (7), the liquid flowing into the centrifugal pump vane is applied with a pre-swirl in the rotational direction of the rotational shaft by the inducer, and thus it is possible to suppress occurrence of cavitation. Accordingly, it is possible to suppress deterioration of the efficiency of the pump apparatus due to occurrence of cavitation.

(8) In some embodiments, the pump apparatus (1) described in any one of the above (1) to (7) includes: a body-side casing (7) which accommodates the hub portion (3), the centrifugal pump vane (4), the annular disc portion (5), and the axial turbine blade (6) rotatably, a gas introduction passage (72) for introducing the gas into the axial turbine blade (6) is formed inside the body-side casing (7), and the gas introduction passage (72) is formed partially in a circumferential direction of the rotational shaft.

With the above configuration (8), through the gas introduction passage, a gas is introduced into the axial turbine blade from a part of the circumferential direction. With the axial turbine of the pump apparatus being a partial-feed turbine as described above, it is possible to suppress interference between the gas introduction passage and the liquid discharge passage for discharging the liquid after passing through the centrifugal pump vane. Specifically, it is possible to locate the side of the liquid discharge port of the liquid discharge passage with a large flow-passage area, in a range where the gas introduction passage is not formed in the circumferential direction of the rotational shaft. In this case, it is possible to make the pump apparatus compact and reduce the size and weight of the pump apparatus.

(9) In some embodiments, in the pump apparatus (1) described in the above (8), the gas introduction passage (72) includes: a scroll flow passage (72A) disposed closer to the second side (rear side XR) than the axial turbine blade (6) and formed to have a scroll shape; and an oblique introduction passage (72B) for guiding the gas to the axial turbine blade (6) from the scroll flow passage (72A), the oblique introduction passage (72B) being inclined toward a radially inner side with distance toward the first side (front side XF).

With the above configuration (9), the oblique introduction passage is capable of enhancing the pressure of the gas passing through the oblique introduction passage inclined toward the radially inner side with distance toward the first side. By enhancing the pressure of the gas introduced into the axial turbine blade, it is possible to suppress separation of the gas from the axial turbine blade, and thereby improve the efficiency of the axial turbine of the pump apparatus. Furthermore, with the above configuration (9), the oblique introduction passage is inclined toward the radially outer side with distance toward the second side, and thus it is possible to suppress interference between the liquid discharge passage, and the oblique introduction passage and the scroll flow passage. Accordingly, it is possible to make the pump apparatus compact and reduce the size and weight of the pump apparatus.

REFERENCE SIGNS LIST

1 Pump apparatus
2 Rotational shaft
3 Hub portion
4 Centrifugal pump vane
5 Disc portion
6 Axial turbine blade
7 Body-side casing
8 Inlet-side casing
10 Pump system
10A Axial turbine
10B Centrifugal pump
11 Centrifugal flow passage
12 Liquid flow passage
13 Gas flow passage
14 Nozzle
15 Fastening member
16, 18 Stationary wall
17 Front-side gap
17 Front-side space
19 Rear-side gap
20 Front-side space
21 Rear-side space
22 Gap
23 Labyrinth seal
24 Inducer
31 Circumferential surface
32 Front end
33 Rear end
41 Tip end
55 Through hole
57 Annular recessed portion
71 Liquid discharge passage
71A Scroll flow passage
72 Gas introduction passage
72A Scroll flow passage
72B Oblique introduction passage
74 Liquid discharge port
76 First flange portion
81 Liquid introduction passage
82 Gas discharge passage
84 Outlet opening end
85 Liquid introduction hole
87 Second flange portion
91 Rotational force recovery apparatus
92 Rotational force application apparatus
93 Casing
94 Front-side bearing
95 Rear-side bearing
710 Liquid discharge passage forming portion
720 Gas introduction passage forming portion
C1, C2, C3 Center
L1, L2 Distance
LA Axis
MF Flow of liquid
P1, P2, P3 Pressure
RD Rotational direction
X Axis direction
XF Front side (of axis direction)
XR Rear side (of axis direction)
Y Radial direction

The invention claimed is:
1. A pump apparatus, comprising:
a rotational shaft;
a hub portion mounted to the rotational shaft;
a centrifugal pump vane mounted to a circumferential surface of the hub portion;
an annular disc portion mounted to a tip end of the centrifugal pump vane; and
an axial turbine blade mounted to an outer circumferential surface of the annular disc portion,
wherein a liquid flow passage through which a liquid flowing from a first side toward a second side in an axis direction of the rotational shaft flows into the centrifugal pump vane is formed at a radially inner side of the annular disc portion, wherein a gas flow passage through which a gas flowing from the second side toward the first side passes through the axial turbine blade is formed at a radially outer side of the annular disc portion, and wherein at least a portion of an axial extending area of the centrifugal pump vane overlaps an axial extending area of the axial turbine blade.

2. A pump apparatus, comprising:
a rotational shaft;
a hub portion mounted to the rotational shaft;
a centrifugal pump vane mounted to a circumferential surface of the hub portion;
an annular disc portion mounted to a tip end of the centrifugal pump vane; and
an axial turbine blade mounted to an outer circumferential surface of the annular disc portion,
wherein a liquid flow passage through which a liquid flowing from a first side toward a second side in an axis direction of the rotational shaft flows into the centrifugal pump vane is formed at a radially inner side of the annular disc portion,
wherein a gas flow passage through which a gas flowing from the second side toward the first side passes through the axial turbine blade is formed at a radially outer side of the annular disc portion,
wherein the pump apparatus further comprises:
a body-side casing which accommodates the hub portion, the centrifugal pump vane, the annular disc portion, and the axial turbine blade rotatably; and
an inlet-side casing fastened to the first side of the body-side casing,
wherein the inlet-side casing has, formed inside thereof, a liquid introduction passage for introducing the liquid to the centrifugal pump vane, and a gas discharge passage for discharging the gas after passing through the axial turbine blade, the gas discharge passage being formed at a radially outer side of the liquid introduction passage.

3. A pump apparatus, comprising:
a rotational shaft;
a hub portion mounted to the rotational shaft;
a centrifugal pump vane mounted to a circumferential surface of the hub portion;
an annular disc portion mounted to a tip end of the centrifugal pump vane; and
an axial turbine blade mounted to an outer circumferential surface of the annular disc portion,
wherein a liquid flow passage through which a liquid flowing from a first side toward a second side in an axis direction of the rotational shaft flows into the centrifugal pump vane is formed at a radially inner side of the annular disc portion,
wherein a gas flow passage through which a gas flowing from the second side toward the first side passes through the axial turbine blade is formed at a radially outer side of the annular disc portion,
wherein a first-side gap is formed between an end surface of the annular disc portion at the first side and a stationary wall,
wherein a second-side gap is formed between an end surface of the annular disc portion at the second side and the stationary wall, and
wherein the annular disc portion has a through hole formed therein, the through hole being formed through the annular disc portion along the axis direction of the rotational shaft and bringing the first-side gap or a first-side space communicating with the first-side gap and the second-side gap or a second-side space communicating with the second-side gap into communication.

4. The pump apparatus according to claim 3,
wherein the through hole has a first-side opening end formed at the first side of the annular disc portion and a second-side opening end formed at the second side of the annular disc portion, and a distance L1 between a center of the first-side opening end and an axis of the rotational shaft is greater than a distance L2 between a center of the second-side opening end and the axis of the rotational shaft.

5. The pump apparatus according to claim 3,
wherein the through hole has a first-side opening end formed at the first side of the annular disc portion and a second-side opening end formed at the second side of the annular disc portion, and a distance L1 between a center of the first-side opening end and an axis of the rotational shaft is smaller than a distance L2 between a center of the second-side opening end and the axis of the rotational shaft.

6. A pump apparatus, comprising:
a rotational shaft;
a hub portion mounted to the rotational shaft;
a centrifugal pump vane mounted to a circumferential surface of the hub portion;
an annular disc portion mounted to a tip end of the centrifugal pump vane; and
an axial turbine blade mounted to an outer circumferential surface of the annular disc portion,
wherein a liquid flow passage through which a liquid flowing from a first side toward a second side in an axis direction of the rotational shaft flows into the centrifugal pump vane is formed at a radially inner side of the annular disc portion,
wherein a gas flow passage through which a gas flowing from the second side toward the first side passes through the axial turbine blade is formed at a radially outer side of the annular disc portion,
wherein a second-side gap is formed between an end surface of the annular disc portion at the second side and a stationary wall, and
wherein the pump apparatus comprises:
a body-side casing which accommodates the hub portion, the centrifugal pump vane, the annular disc portion, and the axial turbine blade rotatably; and
a labyrinth seal which seals a gap between the annular disc portion and the body-side casing at a position closer to the second side than the second-side gap.

7. The pump apparatus according to claim 1, further comprising:
an inducer formed on the circumferential surface of the hub portion at a position closer to the first side than the centrifugal pump vane, the inducer being configured to apply a pre-swirl, in a rotational direction of the rotational shaft, to the liquid flowing into the centrifugal pump vane.

8. A pump apparatus, comprising:
a rotational shaft;
a hub portion mounted to the rotational shaft;
a centrifugal pump vane mounted to a circumferential surface of the hub portion;
an annular disc portion mounted to a tip end of the centrifugal pump vane; and
an axial turbine blade mounted to an outer circumferential surface of the annular disc portion, wherein a liquid flow passage through which a liquid flowing from a first side toward a second side in an axis direction of the rotational shaft flows into the centrifugal pump vane is formed at a radially inner side of the annular disc portion, wherein a gas flow passage through which a gas flowing from the second side toward the first side passes through the axial turbine blade is formed at a radially outer side of the annular disc portion, wherein the pump apparatus further comprises a body-side casing which accommodates the hub portion, the centrifugal pump vane, the annular disc portion, and the axial turbine blade rotatably, wherein a gas introduction passage for introducing the gas into the axial turbine blade is formed inside the body-side casing, and wherein the gas introduction passage is formed partially in a circumferential direction of the rotational shaft.

9. The pump apparatus according to claim 8, wherein the gas introduction passage includes:

a scroll flow passage disposed closer to the second side than the axial turbine blade and formed to have a scroll shape; and an oblique introduction passage for guiding the gas to the axial turbine blade from the scroll flow passage, the oblique introduction passage being inclined toward a radially inner side with distance toward the first side.

10. The pump apparatus according to claim 2, further comprising:

an inducer formed on the circumferential surface of the hub portion at a position closer to the first side than the centrifugal pump vane, the inducer being configured to apply a pre-swirl, in a rotational direction of the rotational shaft, to the liquid flowing into the centrifugal pump vane.

11. The pump apparatus according to claim 3, further comprising:

an inducer formed on the circumferential surface of the hub portion at a position closer to the first side than the centrifugal pump vane, the inducer being configured to apply a pre-swirl, in a rotational direction of the rotational shaft, to the liquid flowing into the centrifugal pump vane.

12. The pump apparatus according to claim 6, further comprising:

an inducer formed on the circumferential surface of the hub portion at a position closer to the first side than the centrifugal pump vane, the inducer being configured to apply a pre-swirl, in a rotational direction of the rotational shaft, to the liquid flowing into the centrifugal pump vane.

13. The pump apparatus according to claim 8, further comprising:

an inducer formed on the circumferential surface of the hub portion at a position closer to the first side than the centrifugal pump vane, the inducer being configured to apply a pre-swirl, in a rotational direction of the rotational shaft, to the liquid flowing into the centrifugal pump vane.

* * * * *